(12) United States Patent
Henry et al.

(10) Patent No.: US 12,012,742 B2
(45) Date of Patent: Jun. 18, 2024

(54) DRAIN CONFIGURATION

(71) Applicant: Zurn Industries, LLC, Milwaukee, WI (US)

(72) Inventors: John Henry, Milwaukee, WI (US); Josh Hitchcock, Milwaukee, WI (US); Mike Shipley, Milwaukee, WI (US); Cody Henry, Milwaukee, WI (US)

(73) Assignee: ZURN WATER, LLC, Milwaukee, WI (US)

( * ) Notice: Subject to any disclaimer, the term of this patent is extended or adjusted under 35 U.S.C. 154(b) by 654 days.

(21) Appl. No.: 17/150,276

(22) Filed: Jan. 15, 2021

(65) Prior Publication Data

US 2021/0222418 A1    Jul. 22, 2021

Related U.S. Application Data

(60) Provisional application No. 62/962,477, filed on Jan. 17, 2020.

(51) Int. Cl.
| | | |
|---|---|---|
| *E03F 5/04* | (2006.01) | |
| *B01D 29/085* | (2006.01) | |
| *B01D 29/11* | (2006.01) | |
| *C02F 1/00* | (2023.01) | |

(52) U.S. Cl.
CPC .......... *E03F 5/0407* (2013.01); *B01D 29/085* (2013.01); *B01D 29/11* (2013.01); *C02F 1/003* (2013.01); *C02F 2307/08* (2013.01)

(58) Field of Classification Search
CPC .................................................. E03F 5/0407
See application file for complete search history.

(56) References Cited

U.S. PATENT DOCUMENTS

| | | | | |
|---|---|---|---|---|
| 5,299,836 | A * | 4/1994 | Woods | E03F 5/0407 404/2 |
| 2008/0028515 | A1 * | 2/2008 | Miller | E03F 5/0407 4/695 |
| 2013/0206247 | A1 * | 8/2013 | Wroblewski | E03F 5/0407 137/15.01 |
| 2014/0116527 | A1 * | 5/2014 | Wroblewski | E03F 5/0407 137/15.01 |
| 2015/0292662 | A1 * | 10/2015 | Majocka | E03F 5/041 29/527.1 |
| 2017/0130442 | A1 * | 5/2017 | Brooks | E03F 5/0411 |
| 2019/0119896 | A1 * | 4/2019 | Priester | E03F 5/0407 |
| 2019/0242107 | A1 * | 8/2019 | McLeod | E03F 5/06 |

FOREIGN PATENT DOCUMENTS

DE      102005058920     * 7/2006 ............ E03F 5/0407

* cited by examiner

*Primary Examiner* — J C Jacyna
(74) *Attorney, Agent, or Firm* — Husch Blackwell LLP

(57) ABSTRACT

A drain is positioned in an aperture in a floor surface. The drain includes a flange that defines an opening, extends overt the floor surface and engages the floor surface. A first conduit is connected to the flange and extends through the aperture in the floor surface. The first conduit defines a first length extending downward from the flange and also defines a first perimeter. A second conduit is connected to the flange and extends through the aperture in the floor surface. The second conduit defines a second length extending downward from the flange, and defines a second perimeter. The second perimeter is greater than the first perimeter, the second conduit surrounds the first conduit, the second conduit is outwardly spaced from the first conduit, and the first conduit and the second conduit are coaxial.

16 Claims, 12 Drawing Sheets

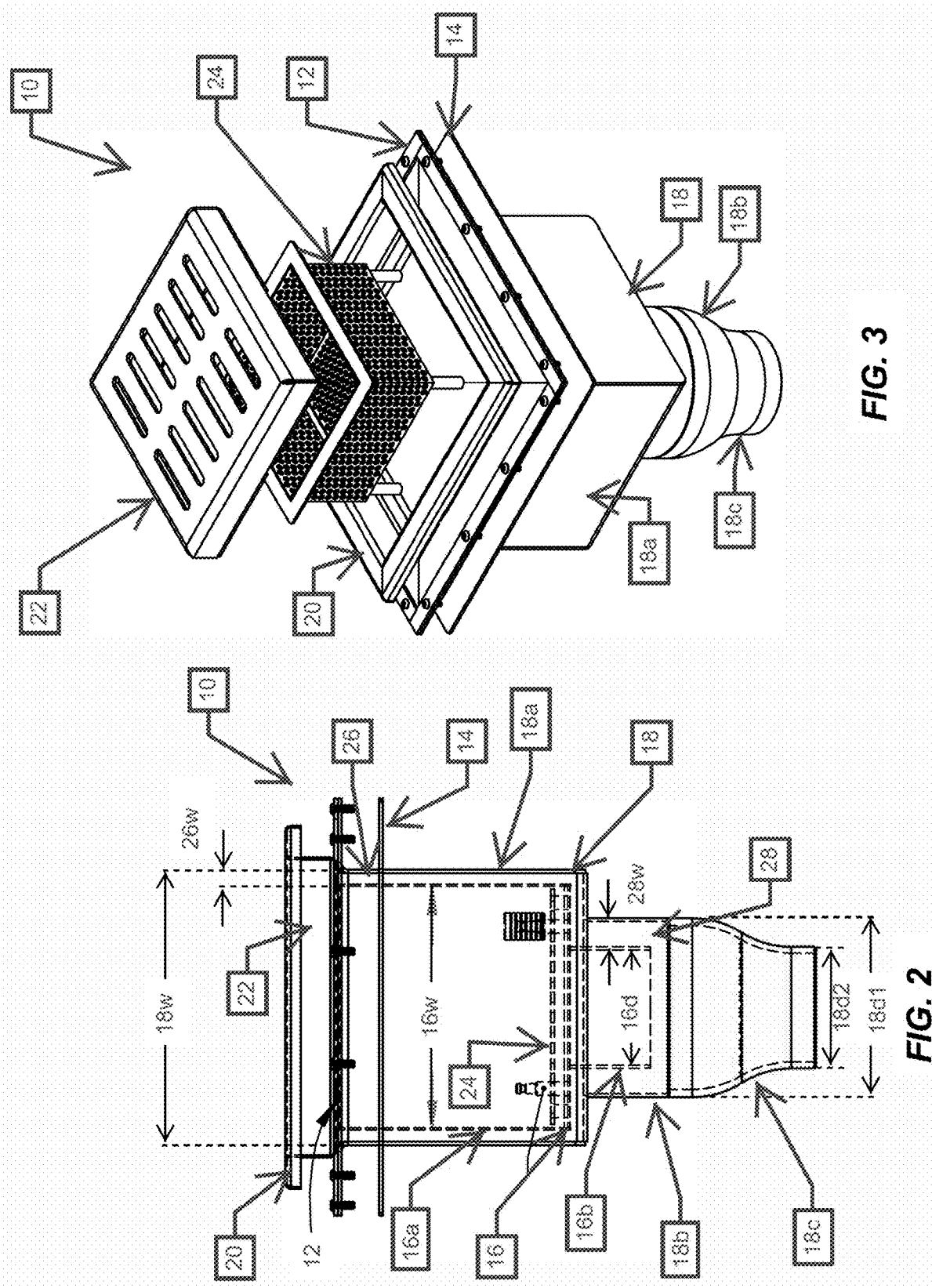

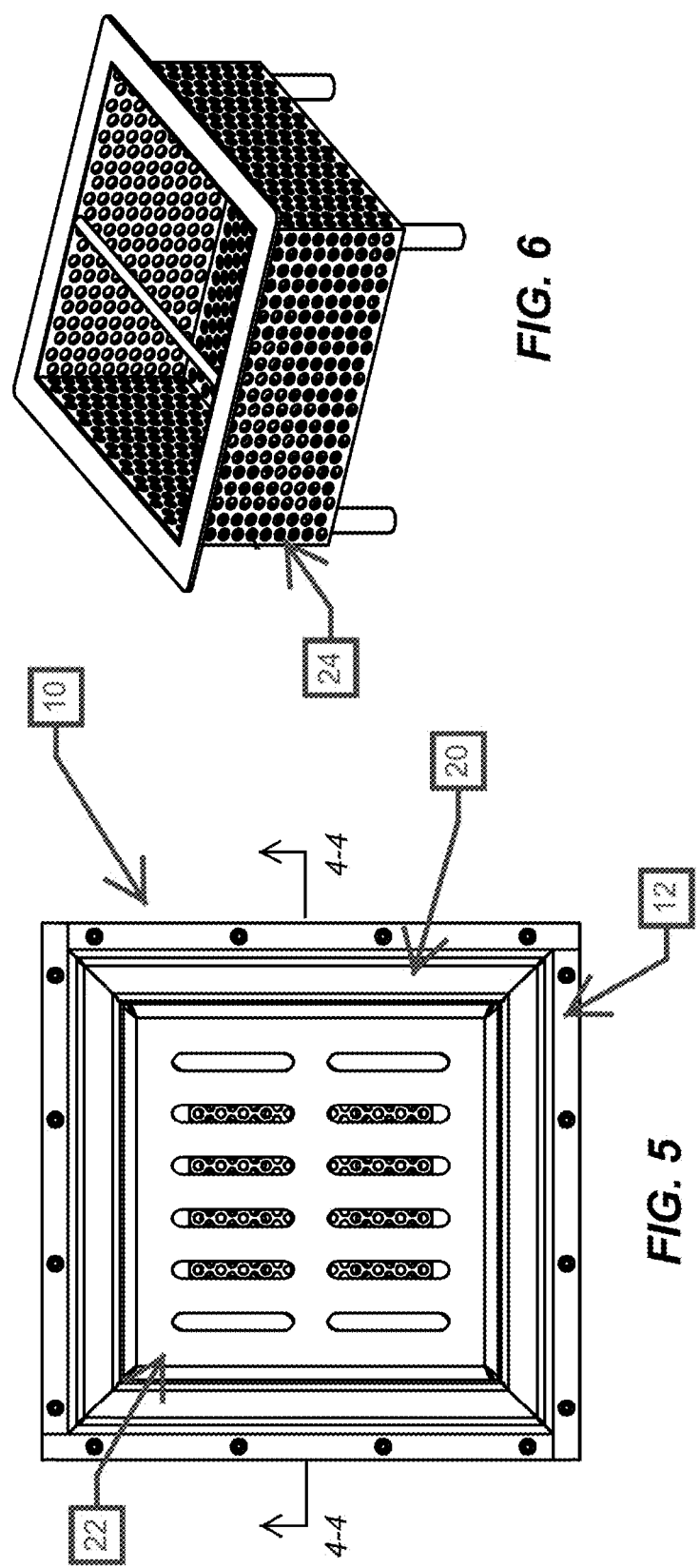

DRAIN CONFIGURATION

CROSS-REFERENCE TO RELATED APPLICATIONS

This application is a non-provisional of and claims the benefit of U.S. Provisional Patent Application No. 62/962,477, filed on Jan. 17, 2020, the contents of which are incorporated herein by reference.

BACKGROUND

In certain applications, a drain can sweat thereby causing water damage to ceilings or other parts of a building.

SUMMARY

The present disclosure provides a primary drain and a secondary containment drain that functions as an insulating boundary to prevent the sweating on the primary drain from occurring.

In one embodiment, the disclosure provides a drain that is positioned in an aperture in a floor surface. The drain includes a flange that defines an opening, extends over the floor surface and engages the floor surface. A first conduit is connected to the flange and extends through the aperture in the floor surface. The first conduit defines a first length extending downward from the flange and also defines a first perimeter. A second conduit is connected to the flange and extends through the aperture in the floor surface. The second conduit defines a second length extending downward from the flange, and defines a second perimeter. The second perimeter is greater than the first perimeter, the second conduit surrounds the first conduit, the second conduit is outwardly spaced from the first conduit, and the first conduit and the second conduit are coaxial.

In another embodiment, the disclosure provides a drain that is positioned in an aperture in a floor surface. The drain includes a flange has an opening, extends along a flange plane, and engages the floor surface. A first conduit is connected to the flange and extends through the aperture in the floor surface. The first conduit has a first length extending downward from the flange plane, and has a first perimeter. The first perimeter substantially corresponds to the opening in the floor surface. A cover plate is sized to cover the opening in the flange. A second conduit is connected to the flange and extends through the aperture in the floor surface. The second conduit has a second length extending substantially downward from the flange plane, and has a second perimeter. The second perimeter is greater than the first perimeter. The second conduit substantially surrounds the first conduit, the second conduit is outwardly spaced from the first conduit in a direction substantially parallel to the flange plane, and the first conduit and the second conduit are coaxial.

Other aspects of the invention will become apparent by consideration of the detailed description and accompanying drawings.

BRIEF DESCRIPTION OF THE DRAWINGS

FIG. 2 is a side view of the drain of FIG. 1.

FIG. 3 is an exploded view of the drain of FIGS. 1 and 2.

FIG. 5 is a top view of the drain.

FIG. 6 is a perspective view of a portion of the drain.

DETAILED DESCRIPTION

Figure 1:
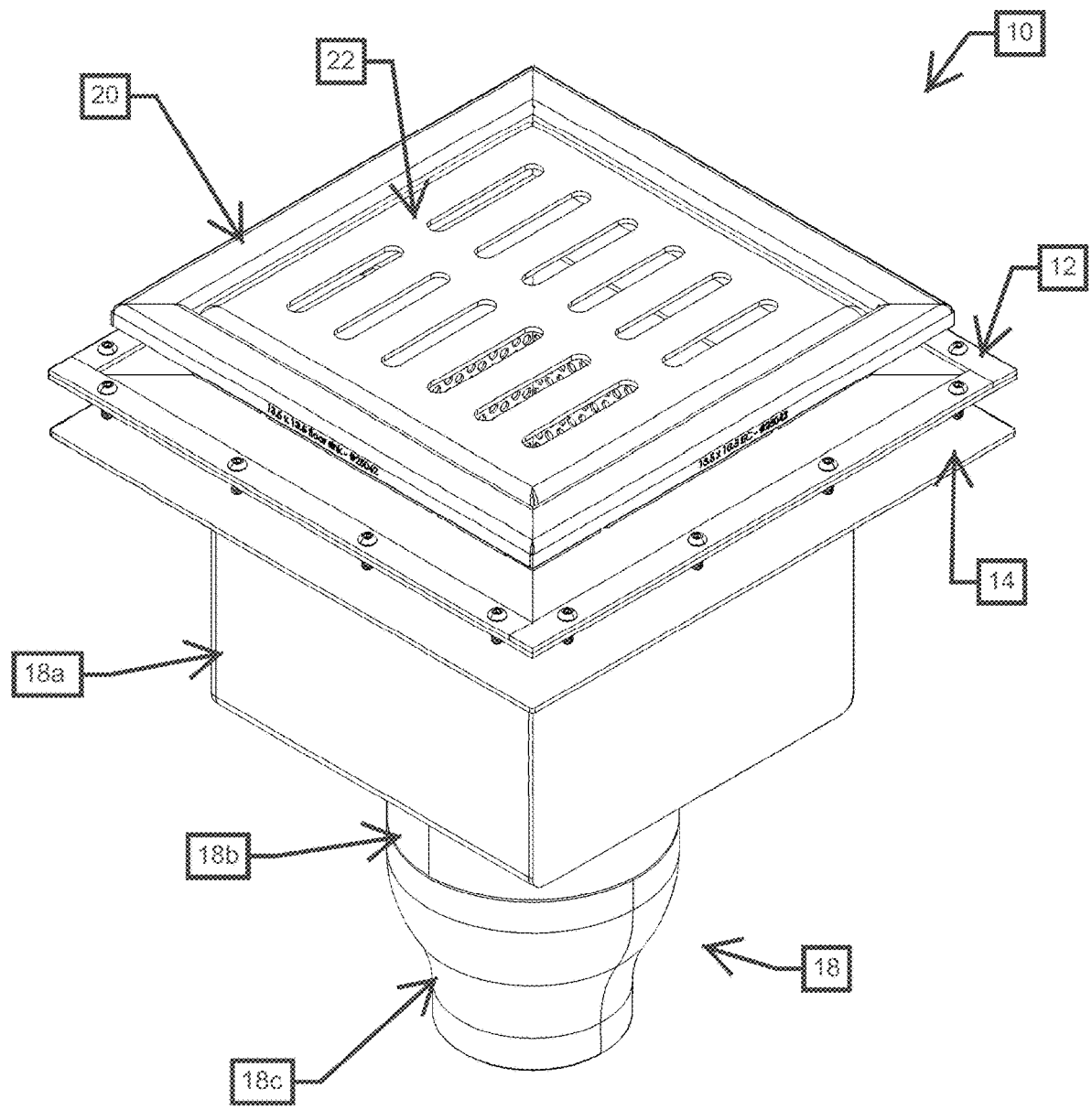
FIG. 1 is a perspective view of a drain according to some embodiments.
Figure 4:
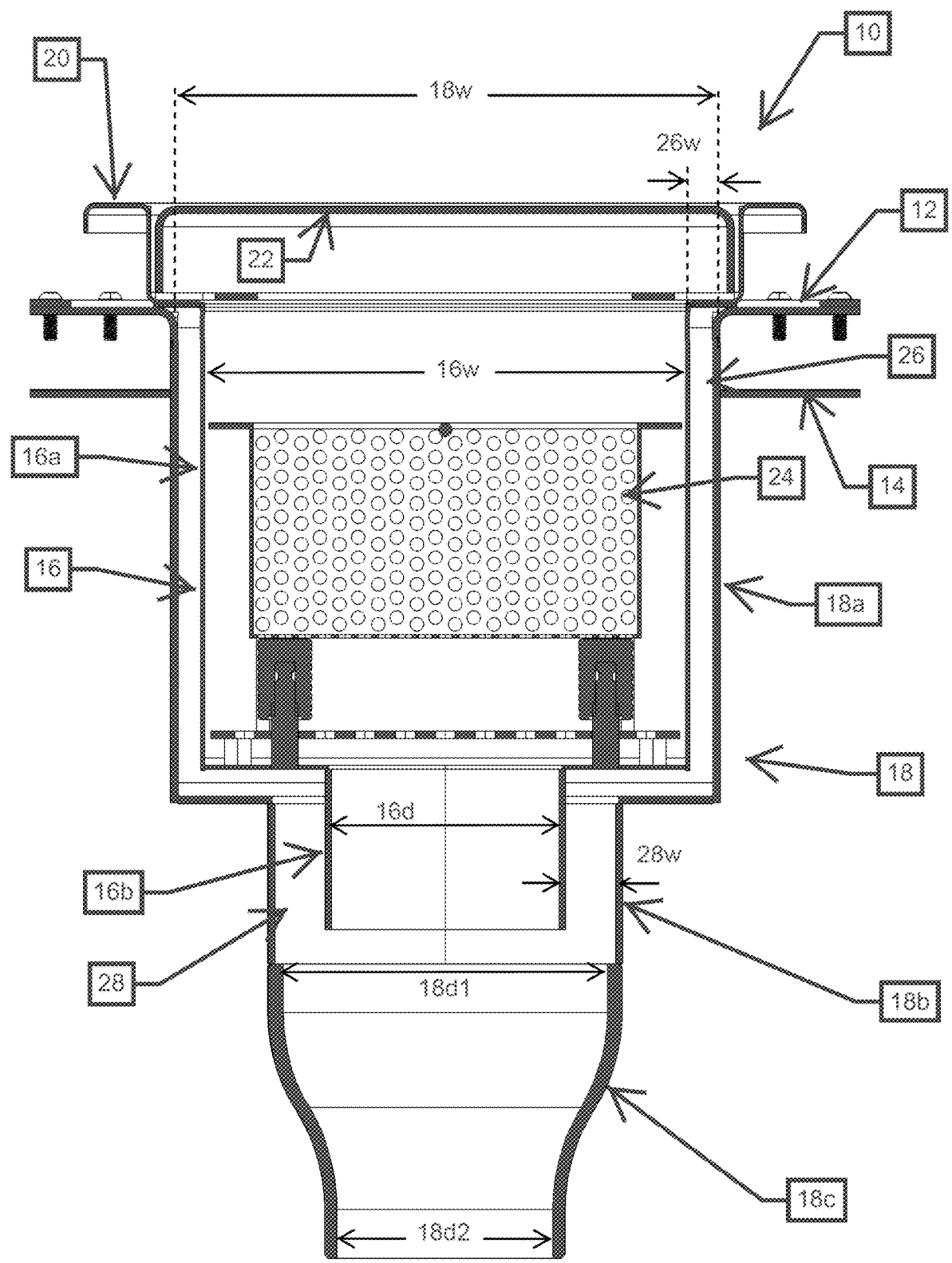
FIG. 4 is a cross-sectional view taken along line 4-4 of FIG. 5.
Figure 7:
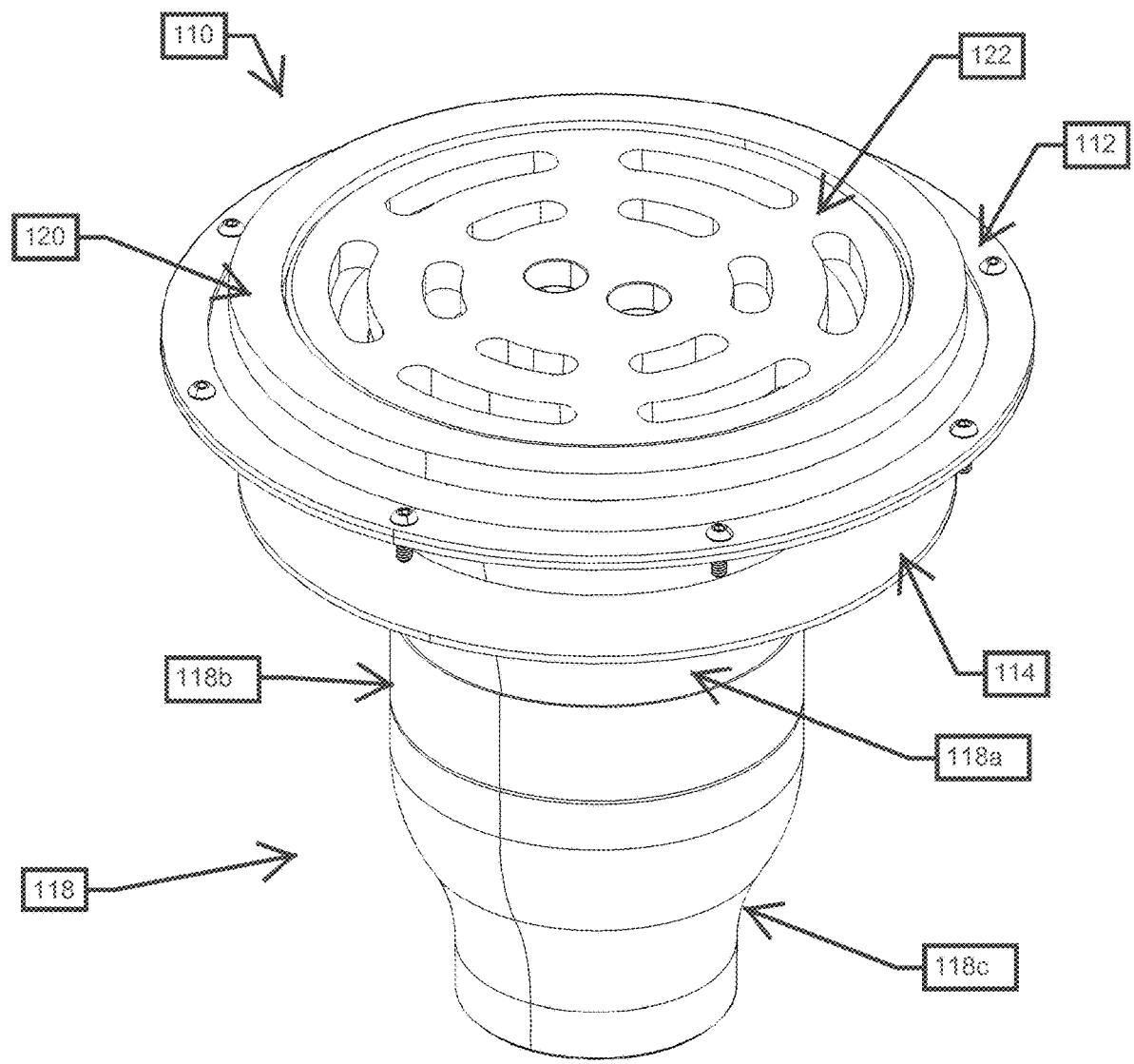
FIG. 7 is a perspective view of a drain according to some embodiments.
Figure 9:
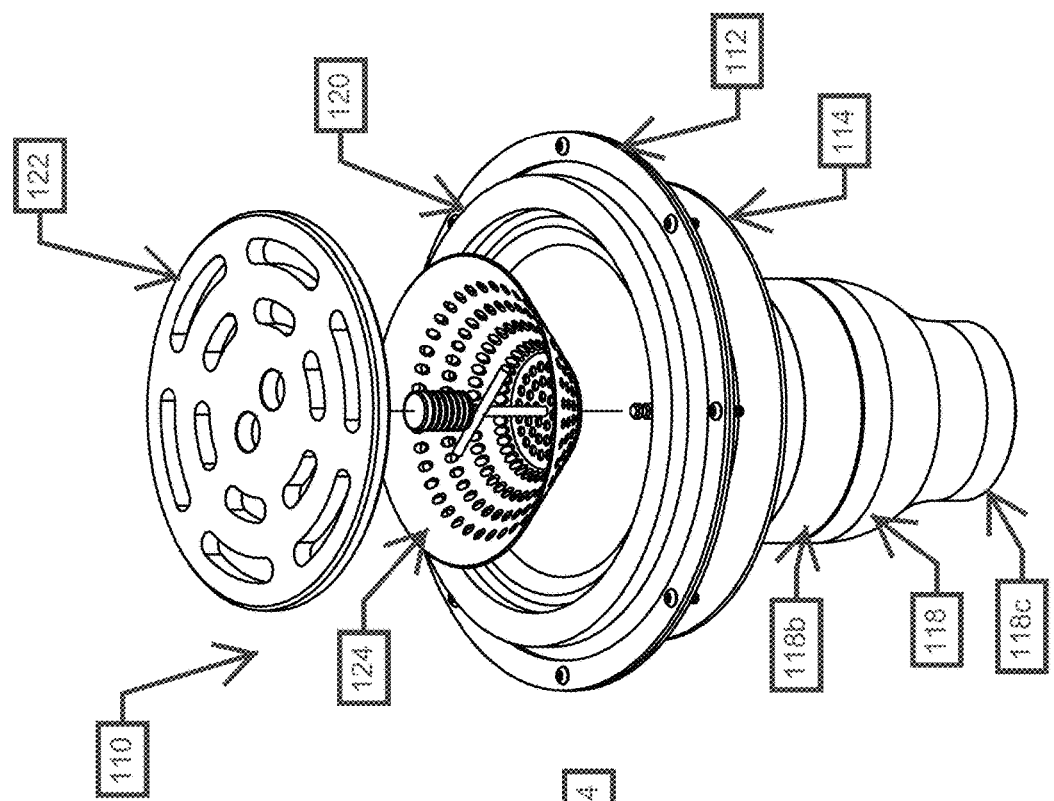
FIG. 9 is an exploded view of the drain of FIGS. 7 and 8.
Figure 8:
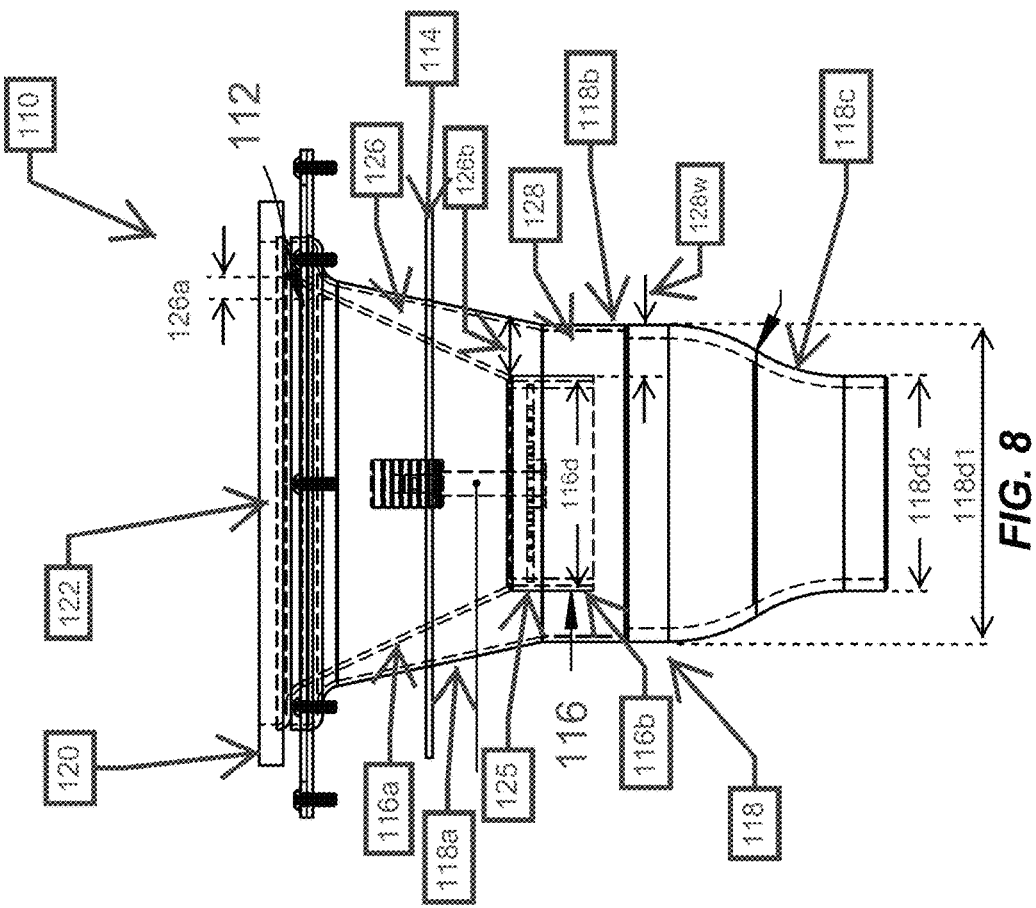
FIG. 8 is side view of the drain of FIG. 7.
Figure 10:
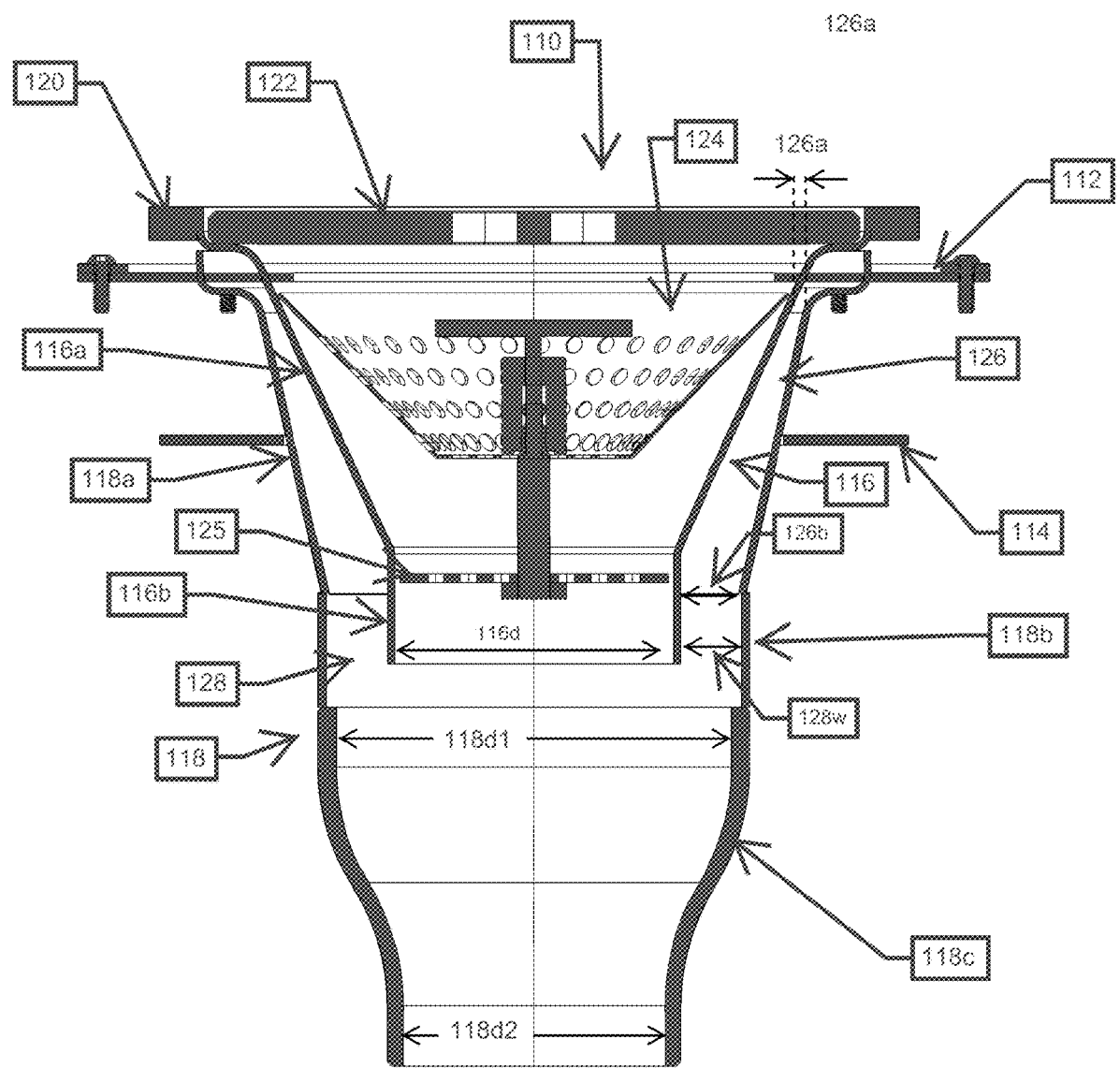
FIG. 10 is a cross-sectional view of the drain taken along line 10-10 of FIG. 11.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1-5 illustrate a drain 10 that can be positioned in an aperture in a floor surface. The drain 10 may include a first flange 12, a second flange 14, a first conduit 16, a second conduit 18, a transition piece 20, a cover plate 22, and a basket 24.

The first flange 12 can include an opening that is sized to receive the first conduit 16 and the basket 24. The first flange 12 defines a first flange plane, can extend over a floor surface and can be connected to the floor surface. The second flange 14 can include an opening that is sized to receive the first conduit 16, the second conduit 18, and the basket 24. The second flange 14 defines a second flange plane that extends substantially parallel to the first flange plane. In some embodiments, the second flange 14 is positioned below a portion of the floor surface, such that the flooring (such as tile) is positioned between the first flange 12 and the second flange 14.

The first conduit 16 includes an upper portion 16a and a lower portion 16b. The upper portion 16a has substantially rectangular cross section extending downward from the first flange 12. The upper portion 16a has a width 16w, a perimeter, and a length depending downward from the first flange 12. The lower portion 16b has a diameter 16d, a perimeter, and a length depending downward from the upper portion 16a. The width 16w is greater than the diameter 16d, and the perimeter of the upper portion 16a is greater than the perimeter of the lower portion 16b.

The second conduit 18 includes an upper portion 18a, a middle portion 18b, and a lower portion 18c. The upper portion 18a has a width 18w, a perimeter and a length depending downward from the first flange 12. The middle portion 18b includes a first diameter 18d1, a first perimeter, and a length depending downward from the upper portion 18a. The lower portion 18c is tapered from the first diameter 18d1 at which the lower portion 18c has a first perimeter, to a second diameter 18d2 at which the lower portion 18c has a second perimeter. The lower portion 18c has a length depending downward from the middle portion 18b.

The width 18w is greater than the first diameter 18d1 and is greater than the second diameter 18d2. The width 18w of the upper portion 18a is greater than the width 16w of the upper portion 16a. The perimeter of the upper portion 18a is greater than the perimeter of the upper portion 16a. The upper portion 18a surrounds and is outwardly spaced from the upper portion 16a. The upper portion 18a and the upper portion 16a are coaxial. A first gap 26 is formed between the upper portion 18a and the upper portion 16a. The first gap 26 has a first gap width 26w.

The first diameter 18d1 is greater than the diameter 16d, whereas the second diameter 18d2 is substantially equal to the diameter 16d. The perimeter of the middle portion 18b is greater than the perimeter of the lower portion 16b. The first perimeter of the lower portion 16b is substantially equal to the perimeter of the middle portion 18b. The second perimeter of the lower portion 16b is substantially equal to the perimeter of the lower portion 16b. The middle portion 18b surrounds and is outwardly spaced from the lower portion 16b. The middle portion 18b and the lower portion 16b are coaxial. A second gap 28 is formed between the middle portion 18b and the lower portion 16b. The second gap 28 has a second gap width 28w. The second gap width 28w can be greater than, equal to or lesser than the first gap width 26w.

The first gap width 26w and the second gap width 28w are each between about ¼ inch and 3 inches. The first gap 26 and the second gap 28 insulate the second conduit 18 from the first conduit 16. The second conduit 18 is often in contact with various components of a building structure. For example, if the drain 10 is positioned in a multi-story building, the drain 10 is positioned in a floor surface, which forms the ceiling of the level below. The first gap 26 and the second gap 28 ensure that the first conduit 16, and any condensation accrued thereon, is insulated from the building structure by the second conduit 18.

In some embodiments, the first gap 26 and/or the second gap 28 is filled with ambient air, whereas in other embodiments, a vacuum is generated between the first conduit 16 and the second conduit 18 such that the vacuum further insulates the first conduit 16 from the second conduit 18. In some embodiments, the first gap 26 and/or the second gap 28 is at least partially filled an insulator that has a thermal conductivity of less than 1 watt per meters-Kelvin. In some embodiments, the first gap 26 and/or the second gap 28 is at least partially filled with one or more of the following insulators: petroleum gel, heat tape, fiber glass, calcium silicate, high density foam, insulating tape, and one or more oils.

The transition piece 20 covers the first flange 12 outside of the cover plate 22. The transition piece 20 can be sized to inhibit entry of fluid to the first conduit 16 between the cover plate 22 and the first flange 12. The transition piece 20 can be connected to the floor surface in any known manner.

The cover plate 22 is sized to cover the opening in the floor surface. The illustrated cover plate 22 is rectangular, but other shapes and sizes can be utilized. The cover plate 22 includes a plurality of slots to permit entry of fluid but to inhibit entry of large particles into the first conduit 16.

With reference to FIG. 6, the basket 24 can be positioned within the upper portion 16a of the first conduit 16 and functions as a filter. The basket 24 includes a plurality of apertures and a handle. The apertures are sized to inhibit large particles from entering the first conduit 16 and the handle permits the user to remove the basket 24 during cleaning.

Reference is now made to FIGS. 7-13 which are directed to another embodiment. Reference numbers will be in the "100" series for corresponding elements. Only the differences between this embodiment and the embodiment of FIGS. 1-6 will be discussed in detail.

FIGS. 7-11 illustrate a drain 110 that can be positioned in an aperture in a floor surface. The drain 110 includes a first flange 112, a second flange 114, a first conduit 116, a second conduit 118, a transition piece 120, a cover plate 122, a basket 124, and a filter 125.

The first flange 112 can include an opening that is sized to receive the first conduit 116 and the basket 124. The first flange 112 defines a first flange plane, can extend over a floor surface and can be connected to the floor surface. The second flange 114 can include an opening that is sized to receive the first conduit 116, the second conduit 118 and the basket 124. The second flange 114 defines a second flange plane that extends substantially parallel to the first flange plane. In some embodiments, the second flange 114 is positioned below a portion of the floor surface, such that the flooring (such as tile) is positioned between the first flange 112 and the second flange 114.

The first conduit 116 includes an upper portion 116a and a lower portion 116b. The upper portion 116a has substantially circular cross section extending downward from the first flange 112 and is generally conical. The upper portion 116a has a first diameter and a first perimeter adjacent the first flange 112 and a second diameter and a second perimeter adjacent the lower portion 116b. The first diameter is greater than the second diameter. The lower portion 116b has a diameter 116d, a perimeter, and a length depending downward from the upper portion 116a. The second diameter of the upper portion 116a is equal to the diameter 116d of the lower portion 116b.

The second conduit 118 includes an upper portion 118a, a middle portion 118b, and a lower portion 118c. The upper portion 118a has a first diameter and a first perimeter adjacent the first flange 112 and a second diameter and a second perimeter adjacent the middle portion 118b. The first diameter is greater than the second diameter and the first perimeter is greater than the second perimeter. The upper portion has a length depending downward from the first flange 112. The middle portion 118b includes a diameter 118d1, a perimeter, and a length depending downward from the upper portion 118a. The lower portion 118c is tapered from the a first diameter at which the lower portion 118c has a first perimeter, to a second diameter 118d2 at which the lower portion 118c has a second perimeter. The lower portion 118c has a length depending downward from the middle portion 118b.

The diameter 118d1 is substantially equal to the first diameter and is greater than the second diameter 118d2. The diameter of the upper portion 118a is tapered from the first diameter, which is greater than the first diameter 118d1, to the second diameter, which is equal to the first diameter 118d1. The first diameter 118d1 is greater than the diameter 116d and the perimeter of the middle portion 118b is greater than the perimeter of the lower portion 116b. The upper portion 118a surrounds and is outwardly spaced from the upper portion 116a. The upper portion 118a and the upper portion 116a are coaxial. A first gap 126 is formed between the upper portion 118a and the upper portion 116a. The first gap 126 has first gap width 126a and a second gap width 126b. A third gap 128 is formed between the middle portion 118*b* and the lower portion 116*b*. The third gap 128 has a third gap width 128*w*. The illustrated third gap width 128*w* is greater than the first gap width 126*a* and is lesser than the second gap width 126*b*.

The first gap width 126*a*, the second gap width 126*b* and the third gap width 128*w* are each between about ¼ inch and 3 inches. The first gap width 126*a*, the second gap width 126*b* and the third gap width 128*w* insulate the second conduit 118 from the first conduit 116. The second conduit 118 is often in contact with various components of a building structure. For example, if the drain 110 is positioned in a multi-story building, the drain 110 is positioned in a floor surface which forms a ceiling of the level below. The first gap width 126*a*, the second gap width 126*b* and the third gap width 128*w* ensures that the first conduit 116, and any condensation accrued thereon, is insulated from the building structure by the second conduit 118.

In some embodiments, the first gap 126 and/or the third gap 128 is filled with ambient air, whereas in other embodiments, a vacuum is generated between the first conduit 116 and the second conduit 118 such that the vacuum further insulates the first conduit 116 from the second conduit 118. In some embodiments, the first gap 126 and/or the third gap 128 is at least partially filled with an insulator that has a thermal conductivity of less than 1 watt per meters-Kelvin. In some embodiments, the first gap 126 and/or the third gap 128 is at least partially filled with one or more of the following insulators: petroleum gel, heat tape, fiber glass, calcium silicate, high density foam, insulating tape, and one or more oils.

The transition piece 120 covers the first flange 112 outside of the cover plate 122. The transition piece 120 can be sized to inhibit entry of fluid to the first conduit 116 between the cover plate 122 and the first flange 112. The transition piece 120 can be connected to the floor surface in any known manner.

The cover plate 122 is sized to cover the opening in the floor surface. The illustrated cover plate 122 is circular, but other shapes and sizes can be utilized. The cover plate 122 includes a plurality of slots to permit entry of fluid but to inhibit entry of large particles into the first conduit 116.

Figure 12:
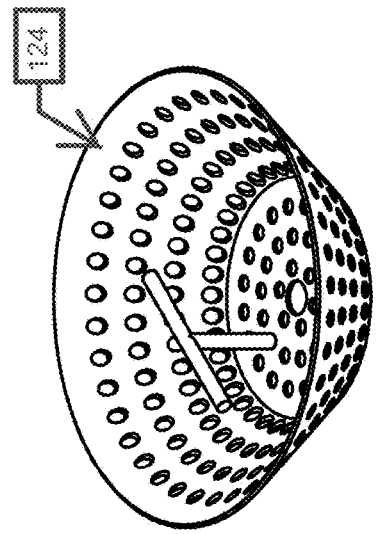
FIG. 12 is a perspective view of a portion of the drain.

With reference to FIG. 12, the basket 124 can be positioned within the upper portion 116*a* of the first conduit 116 and functions as a filter. The basket 124 includes a plurality of apertures and a handle. The apertures are sized to inhibit large particles from entering the first conduit 116 and the handle permits the user to remove the basket 124 during cleaning.

Figure 13:
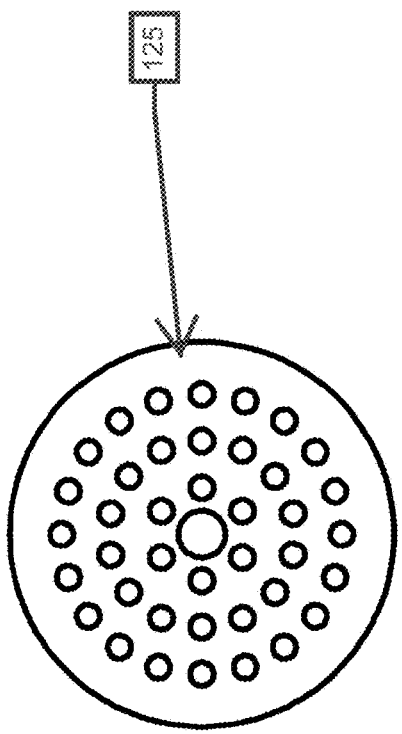
FIG. 13 is a top view of a portion of the drain.
Figure 11:
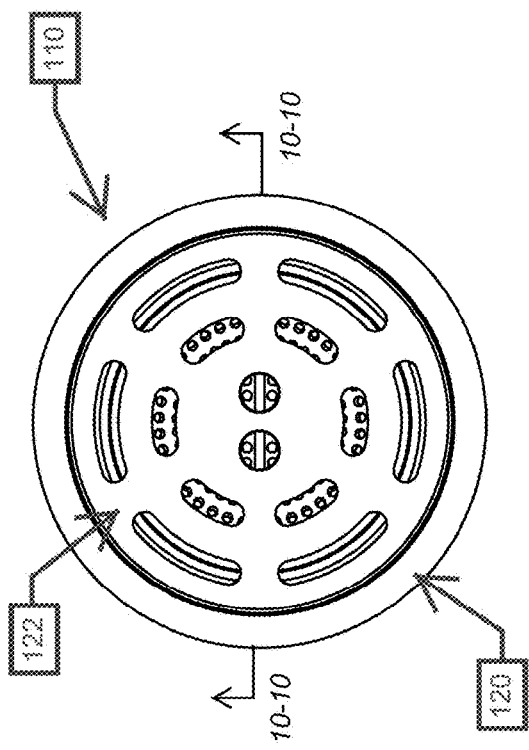
FIG. 11 is a top view of a portion of the drain.
Figure 14:
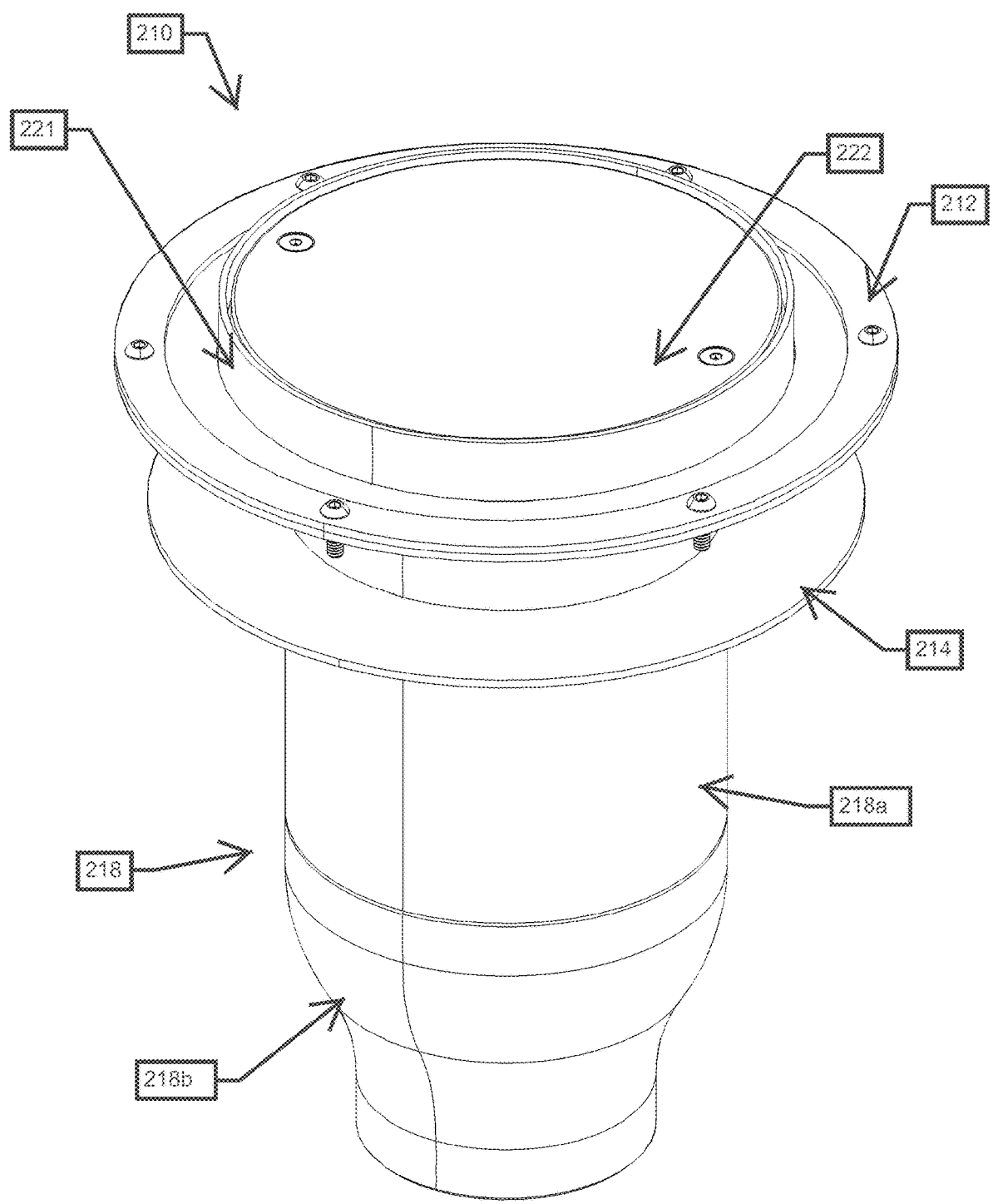
FIG. 14 is a perspective view of a drain according to some embodiments.
Figure 16:
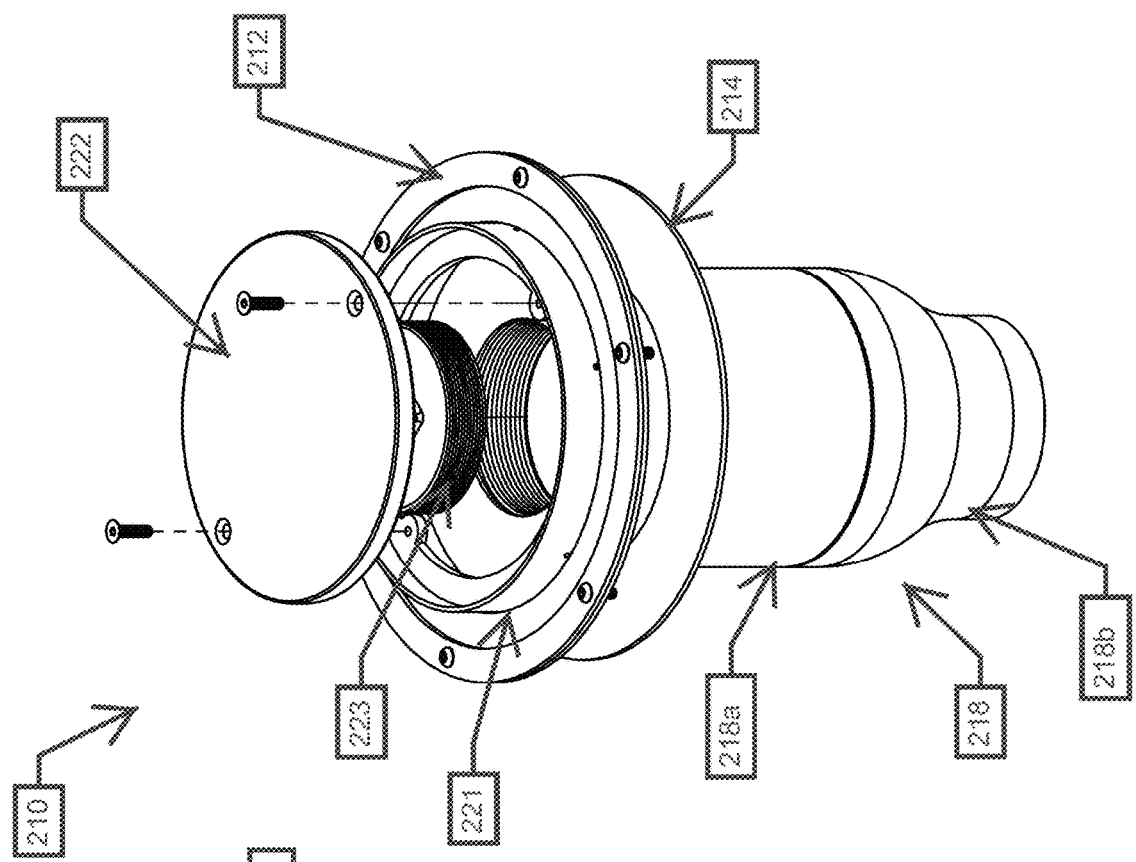
FIG. 16 is an exploded view of the drain of FIGS. 14 and 15.
Figure 15:
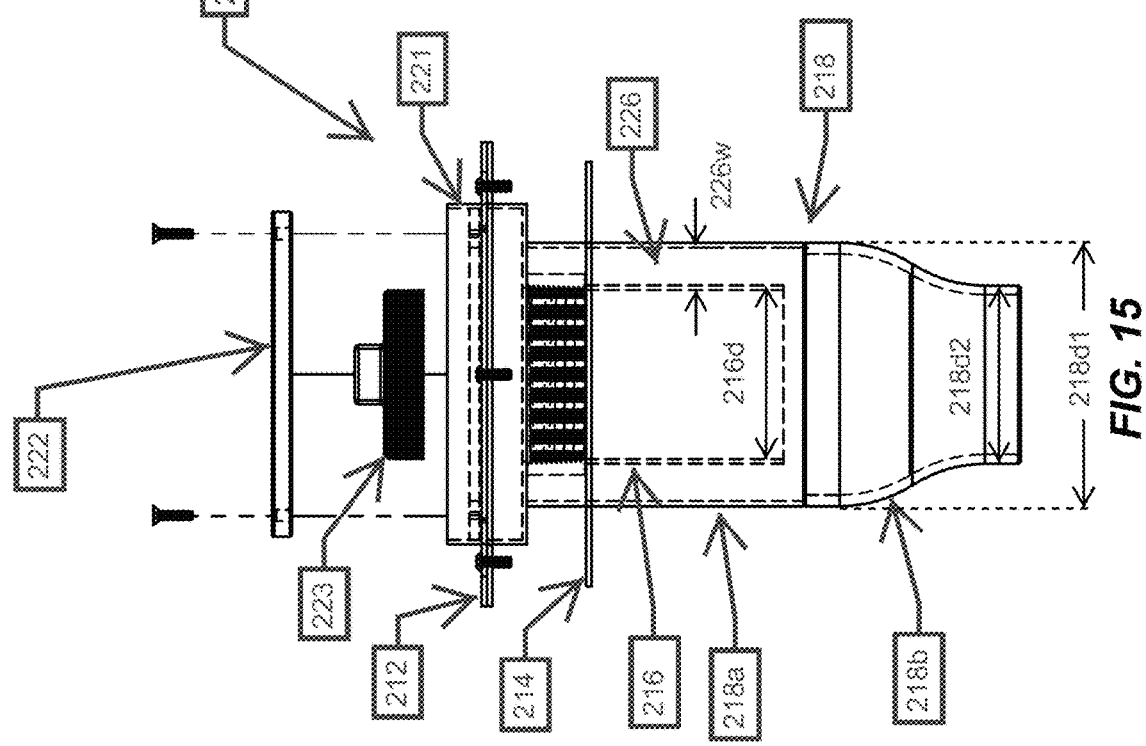
FIG. 15 is a side view of the drain of FIG. 14.
Figure 17:
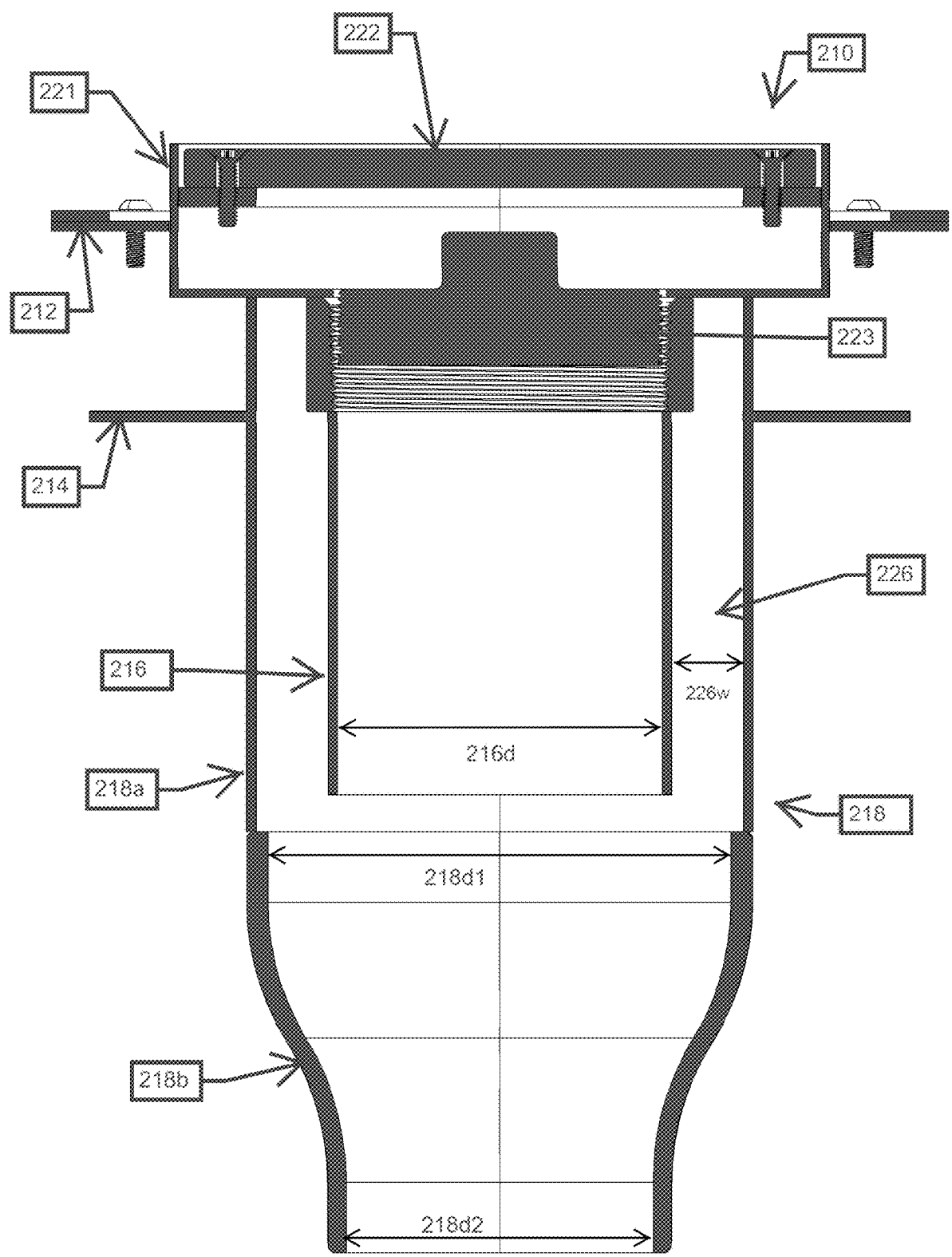
FIG. 17 is a cross-sectional view of the drain taken along line 17-17 of FIG. 18.

With reference to FIG. 13, the filter 125 includes a plurality of apertures. The apertures are sized to inhibit large particles from entering the first conduit 116. The filter 125 can be connected to the first conduit 116 via a magnet or other mechanism that allows removal and re-attachment.

Reference is now made to FIGS. 14-19 which are directed to a different embodiment. Reference numbers will be in the "200" series for corresponding elements. Only the differences between this embodiment and the embodiments of FIGS. 1-13 will be discussed in detail.

FIGS. 14-17 illustrate a drain 210 that can be positioned in an aperture in a floor surface. The drain 210 includes a first flange 212, a second flange 214, a first conduit 216, a second conduit 218, an upstanding flange 221, a cover plate 222, and a plug 223.

The first flange 212 can include an opening that is sized to receive the first conduit 216. The first flange 212 defines a first flange plane, can extend over a floor surface and can be connected to the floor surface. The second flange 214 can include an opening that is sized to receive the first conduit 216 and the second conduit 218. The second flange 214 defines a second flange plane that extends substantially parallel to the first flange plane. In some embodiments, the second flange 214 is positioned below a portion of the floor surface, such that the flooring (such as tile) is positioned between the first flange 212 and the second flange 214.

The first conduit 216 has substantially circular cross section extending downward from the first flange 212. The first conduit 216 has a diameter 216*d*, a perimeter, and a length depending downward from the first flange 212. An upper portion of the first conduit 216 includes threads to receive the plug 223.

The second conduit 218 includes an upper portion 218*a* and a lower portion 218*b*. The upper portion 218*a* has a diameter 218*d*1 and a perimeter and a length depending downward from the first flange 212. The lower portion 218*b* is tapered from a first diameter, which is equal to the diameter 218*d*1 and at which the lower portion 218*b* has a first perimeter, to a second diameter 218*d*2 at which the lower portion 218*c* has a second perimeter. The lower portion 218*b* has a length depending downward from the upper portion 118*a*.

The first diameter is equal to the diameter 218*d*1 and is greater than the second diameter 218*d*2. The first diameter is greater than the diameter 216*d* and the perimeter of the upper portion 218*a* is greater than the perimeter of the first conduit 216. The upper portion 218*a* surrounds and is outwardly spaced from the first conduit 216. The upper portion 218*a* and the first conduit 216 are coaxial. A gap 226 is formed between the upper portion 218*a* and the first conduit 216. The gap 226 has a gap width 226*w*.

The gap width 226*w* is between about ¼ inch and 3 inches. The gap 226 insulates the second conduit 218 from the first conduit 216. The second conduit 218 is often in contact with various components of a building structure. For example, if the drain 210 is positioned in a multi-story building, the drain 210 is positioned in a floor surface, which is above another ceiling. The gap 226 ensures that the first conduit 216, and any condensation accrued thereon, is insulated from the building structure by the second conduit 218.

In some embodiments, the gap 226 is filled with ambient air, whereas in other embodiments, a vacuum is generated between the first conduit 216 and the second conduit 218 such that the vacuum further insulates the first conduit 216 from the second conduit 218. In some embodiments, the gap 226 is at least partially filled an insulator that has a thermal conductivity of less than 1 watt per meters-Kelvin. In some embodiments, the gap 226 is at least partially filled with one or more of the following insulators: petroleum gel, heat tape, fiber glass, calcium silicate, high density foam, insulating tape and one or more oils.

The upstanding flange 221 is connected to the first flange 212 and is sized to receive the cover plate 222. The upstanding flange 221 can be sized to inhibit entry of fluid to the first conduit 216 between the cover plate 222 and the first flange 212.

The cover plate 222 is sized to cover the opening in the floor surface. The illustrated cover plate 122 is circular, but other shapes and sizes can be utilized. The cover plate 122 is removable from the upstanding flange 221 to thereby permit fluid flow through the aperture in the upstanding flange 221 and replaceable to inhibit fluid flow through the aperture in the upstanding flange 221.

Figure 18:
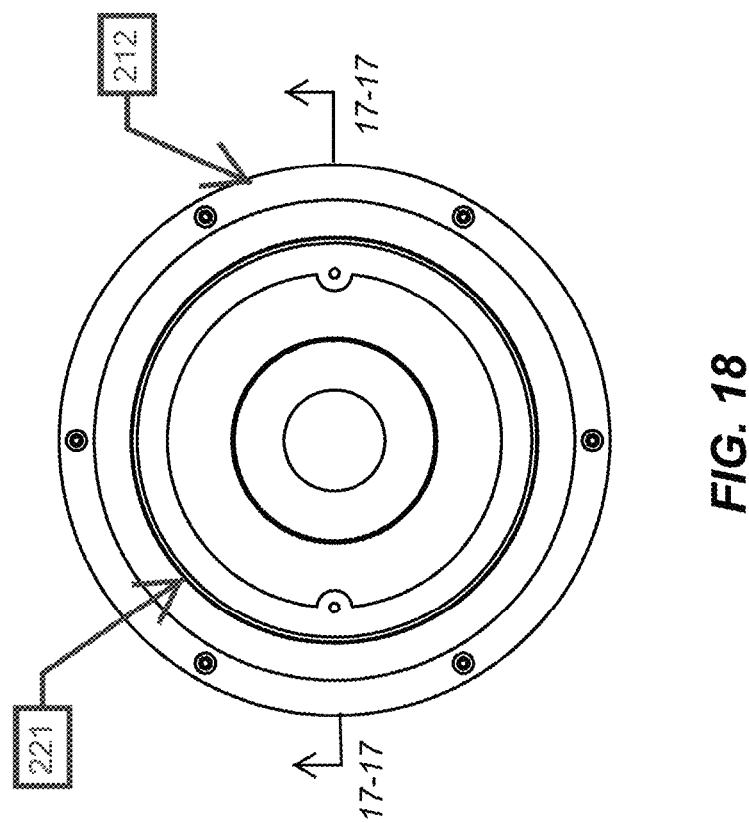
FIG. 18 is a top view of a portion of the drain.

FIG. 18 shows the first flange 212, the upstanding flange 221 with the cover plate 222 and the plug 223 removed for clarity. The upstanding flange 221 includes to protrusions with apertures sized to receive fasteners. The protrusions are sized to support the cover plate 222 and the fasteners are configured to couple the cover plate 222 to the upstanding flange 221.

Figure 19:
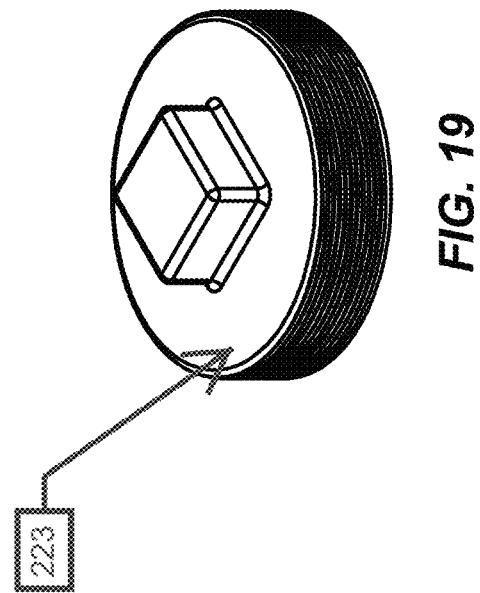
FIG. 19 is a perspective view of a portion of the drain.

With reference to FIG. 19, the plug 223 can be positioned within an upper portion of the first conduit 216. The plug 223 includes threads that are configured to engage mating threads in the upper portion of the first conduit 216. The plug 223 is removable to permit fluid flow into the first conduit 216 and is replaceable to inhibit flow of fluid into the first conduit 216.

What is claimed is:

1. A drain configured to be positioned in an aperture in a floor surface, the drain comprising:
   a flange defining an opening, the flange extending over the floor surface and configured to engage the floor surface;
   a first conduit connected to the flange and extending through the aperture in the floor surface, the first conduit defining a first length extending downward from the flange, the first conduit defining a first perimeter; and
   a second conduit connected to the flange and extending through the aperture in the floor surface, the second conduit in contact with a portion of a floor structure, the second conduit defining a second length extending downward from the flange, the second conduit defining a second perimeter, the second perimeter being greater than the first perimeter, the second conduit surrounding the first conduit, the second conduit being outwardly spaced from the first conduit, and the first conduit and the second conduit being coaxial, the first conduit and the second conduit forming a gap therebetween that is filled with air having a gap air pressure, the gap air pressure being less than a pressure of the atmosphere surrounding the second conduit.

2. The drain of claim 1, wherein the gap has a length of between ¼ inch and 3 inches.

3. A drain configured to be positioned in an aperture in a floor surface, the drain comprising:
   a flange defining an opening, the flange extending along a flange plane, the flange configured to engage the floor surface;
   a first conduit connected to the flange and extending through the aperture in the floor surface, the first conduit defining a first length extending downward from the flange plane, the first conduit defining a first perimeter, the first perimeter substantially corresponding to the aperture in the floor surface;
   a cover plate sized to cover the opening in the flange; and
   a second conduit connected to the flange and extending through the aperture in the floor surface, the second conduit in contact with a portion of a floor structure, the second conduit defining a second length extending substantially downward from the flange plane, the second conduit defining a second perimeter, the second perimeter being greater than the first perimeter, the second conduit substantially surrounding the first conduit, the second conduit being outwardly spaced from the first conduit in a direction substantially parallel to the flange plane, the first conduit and the second conduit being coaxial, the first conduit and the second conduit forming a gap therebetween that is filled with air;
   wherein the first conduit has an upper portion and a lower portion having a width that is less than a width of the upper portion, wherein the second conduit has an upper portion and a lower portion, wherein the gap is a first gap formed between the upper portion of the first conduit and the upper portion of the second conduit, and further forming a second gap between the lower portion of the first conduit and the lower portion of the second conduit.

4. The drain of claim 3, wherein the cover plate includes a plurality of apertures.

5. The drain of claim 3, wherein the cover plate is removable from the flange to thereby permit fluid flow through the aperture in the flange and replaceable to inhibit fluid flow through the aperture in the flange.

6. The drain of claim 1, wherein the first conduit has an upper portion and a lower portion having a width that is less than a width of the upper portion, wherein the second conduit has an upper portion and a lower portion, wherein the gap is a first gap formed between the upper portion of the first conduit and the upper portion of the second conduit, and further forming a second gap between the lower portion of the first conduit and the lower portion of the second conduit.

7. The drain of claim 1, wherein at least one of the first conduit and the second conduit has a rectangular profile.

8. The drain of claim 1, wherein the first conduit and the second conduit each have a rectangular profile.

9. The drain of claim 1, further comprising a basket removably supported within an upper portion of the first conduit.

10. The drain of claim 3, wherein at least one of the first conduit and the second conduit has a rectangular profile.

11. The drain of claim 3, wherein the first conduit and the second conduit each have a rectangular profile.

12. The drain of claim 3, further comprising a basket removably supported within an upper portion of the first conduit.

13. A drain configured to be positioned in an aperture in a floor structure, the drain comprising:
   a flange including an opening and configured to engage an upper surface of the floor structure;
   a first conduit supported on the flange and extending through the aperture in the floor structure, the first conduit extending downwardly from the flange by a first length, the first conduit defining a first perimeter;
   a second conduit connected to the flange and extending through the aperture in the floor structure, the second conduit positioned between the floor structure and the first conduit, the second conduit surrounding the first conduit and spaced apart from the first conduit to form a gap therebetween that is filled with air, the second conduit and the gap insulating the floor structure from condensation formed on an outer surface of the first conduit; and
   a basket removably supported within an upper portion of the first conduit.

14. The drain of claim 13, wherein the first conduit has an upper portion and a lower portion having a width that is less than a width of the upper portion, wherein the second conduit has an upper portion and a lower portion, wherein the gap is a first gap formed between the upper portion of the first conduit and the upper portion of the second conduit, and further forming a second gap between the lower portion of the first conduit and the lower portion of the second conduit.

15. The drain of claim 14, wherein the lower portion of the second conduit has a width that is less than a width of the upper portion of the second conduit.

16. The drain of claim 13, wherein at least one of the first conduit and the second conduit has a rectangular profile.

\* \* \* \* \*